United States Patent
Pan

(10) Patent No.: US 7,167,298 B2
(45) Date of Patent: Jan. 23, 2007

(54) HIGH CONTRAST SPATIAL LIGHT MODULATOR AND METHOD

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 0 days.

(21) Appl. No.: 10/974,468

(22) Filed: Oct. 26, 2004

(65) Prior Publication Data

US 2005/0128564 A1 Jun. 16, 2005

Related U.S. Application Data

(60) Provisional application No. 60/514,589, filed on Oct. 27, 2003.

(51) Int. Cl.
*G02B 26/00* (2006.01)

(52) U.S. Cl. .................. 359/291; 359/290; 359/292; 359/295

(58) Field of Classification Search ............ 359/290, 359/291, 292, 295, 298
See application file for complete search history.

(56) References Cited

U.S. PATENT DOCUMENTS

| 5,061,049 A | 10/1991 | Hornbeck |
| 5,142,405 A | 8/1992 | Hornbeck |
| 5,172,262 A | 12/1992 | Hornbeck |
| 5,331,454 A | 7/1994 | Hornbeck |
| 5,382,961 A | 1/1995 | Gale, Jr. |
| 5,650,881 A | 7/1997 | Hornbeck |
| 5,665,997 A * | 9/1997 | Weaver et al. ............ 257/414 |
| 6,356,378 B1 * | 3/2002 | Huibers ..................... 359/291 |
| 6,992,810 B2 | 1/2006 | Pan |

OTHER PUBLICATIONS

Larry J. Hornbeck, "Digital Light Processing™ for High-Brightness, High-Resolution Applications", Feb. 10-12, 1997, San Jose, CA, pp. 1-14.

Shaoher X. Pan, "High Contrast Spatial Light Modulator", U.S. Appl. No. 10/974,461, filed Oct. 25, 2004, 31 pp.

* cited by examiner

*Primary Examiner*—David N. Spector
(74) *Attorney, Agent, or Firm*—Fish & Richardson P.C.

(57) ABSTRACT

A high contrast spatial light modulator for display and printing is fabricated by coupling a high active reflection area fill-ratio and non-diffractive micro-mirror array with a high electrostatic efficiency and low surface adhesion control substrate.

21 Claims, 11 Drawing Sheets

HIGH CONTRAST SPATIAL LIGHT MODULATOR AND METHOD

CROSS REFERENCE TO RELATED APPLICATIONS

This application claims priority to the U.S. Provisional Patent Application entitled, "High Contrast Spatial Light Modulator and Method", filed Oct. 27, 2003, Ser. No. 60/514,589, the contents of which are incorporated herein by reference.

FIELD OF THE INVENTION

This invention relates to arrays of spatial light modulators (SLMs) and their fabrication, and more particularly to a micro-mirror array with electronically addressable control circuitry for display and printing applications.

BACKGROUND OF THE INVENTION

Over the past fifteen to twenty years, micro-mirror based spatial light modulators (SLM) have made incremental technical progress and have gained acceptance in the display industry. The devices operate by tilting individual micro-mirror plates in the array around a torsion hinge with an electrostatic torque to deflect the incident light in a predetermined exit direction. In a more popular digital mode operation, the directional light is turned "on" or "off" by selectively rotating the individual mirrors in a micro-mirror array and mechanically stopped at a specific landing position to ensure the precision of deflection angles. A functional micro-mirror array requires low contact sticking forces at the mechanical stops and high efficiency electrostatic torques to control timing, to overcome surfaces contact adhesion, and to ensure reliability. A high performance spatial light modulator for display applications produces high brightness and high contrast ratio videos images.

Early SLM in video applications suffers a disadvantage of low brightness and low contrast ratio of the projected images. Previous SLM designs typically have a low active reflection area fill-ratio of pixels (e.g., ratio between active reflective areas and non-active areas in each pixel). A large inactive area around each pixel in the array of SLM results in a low optical coupling efficiency and low brightness. The scattered light from these inactive areas in the array forms diffraction patterns that adversely impact the contrast of video images. Another factor reducing the contrast ratio of micro-mirror array based SLM is the diffraction of the scattered light from two straight edges of each mirror in the array that are perpendicular to the incident illumination. In a traditional square shape mirror design, orthogonal incident light is scattered directly by the perpendicular straight leading and trailing edges of each mirror in the array during the operation. The scattered light produces a diffraction pattern and the projection lenses collect much of the diffracted light. The bright diffraction pattern smears out the high contrast of projected video images.

One type of micro-mirror based SLM is the Digital Mirror Device (DMD), developed by Texas Instruments. The most recent implementations include a micro-mirror plate suspended via a rigid vertical support post on top of a yoke plate. The yoke plate further comprises a pair of torsion hinges and two pairs of horizontal landing tips above addressing electrodes. The electrostatic forces on the yoke plate and mirror plate controlled by the voltage potentials on the addressing electrodes cause the bi-directional rotation of both plates. The double plate structure is used to provide an approximately flat mirror surface that covers the underlying circuitry and hinge mechanism, which is one way to achieve an acceptable contrast ratio.

However, the vertical mirror support post that elevates the mirror plate above the hinge yoke plate has two negative influences on the contrast ratio of the DMD. First, a large dimple (caused by the fabrication of mirror support post) is present at the center of the mirror in current designs that causes scattering of the incident light and reduces optical efficiency. Second, double plate rotation causes a horizontal displacement of mirror surfaces along the surface of DMD, resulting in a horizontal vibration of a micro-mirror during operation. The horizontal movement of mirrors requires extra larger gaps to be designed in between the mirrors in the array, reducing the active reflection area fill-ratio further. For example, if the rotation of the mirror in each direction is 12°, every one micron apart between the mirror and the yoke results in 0.2 microns horizontal displacement in each direction. In other words, more than 0.4 microns spacing between the adjacent mirrors is required for every one micron length of mirror support post to accommodate the horizontal displacement.

The yoke structure limits the electrostatic efficiency of the capacitive coupling between the bottom electrodes and the yoke and mirror. Especially in a landing position, the yoke structure requires a high voltage potential bias between the electrodes and the yoke and mirror to enable the angular crossover transition. Double plate structures scatter incident light which also reduces the contrast ratio of the video images.

Another prior art reflective SLM includes an upper optically transmissive substrate held above a lower substrate containing addressing circuitry. Two hinge posts from the upper substrate suspend one or more electrostatically deflectable elements. In operation, individual mirrors are selectively deflected and serve to spatially modulate light that is incident to, and then reflected back through, the upper transmissive substrate. Motion stops may be attached to the reflective deflectable elements so that the mirror does not snap to the bottom control substrate. Instead, the motion stop rests against the upper transmissive substrate thus limiting the deflection angle of the reflective deflectable elements.

In such a top hanging mirror design, the mirror hanging posts and mechanical stops are all exposed to the light of illumination, which reduces the active reflection area fill-ratio and optical efficiency, and increases the light scattering. It is also difficult to control the smoothness of reflective mirror surfaces, which is sandwiched between the deposited aluminum film and LPCVD silicon nitride layers. Deposition film quality determines the roughness of reflective aluminum surfaces. No post-polishing can be done to correct the mirror roughness.

In would be highly desirable to provide a high contrast spatial light modulator that overcomes the foregoing shortcomings associated with prior art techniques.

SUMMARY OF THE INVENTION

The present invention is method of manufacturing a high contrast spatial light modulator (SLM) comprising a high active reflection area fill-ratio and non-diffractive micro-mirror array and a high electrostatic efficiency and low surface adhesion control substrate.

According to another embodiment of the present invention, pairs of torsion hinges are embedded under the cavities to be part of the lower portion of a mirror plate, and are kept a minimum distance under the reflective surface to allow only a gap for a predetermined angular rotation. Each mirror in the array is suspended by a pair of torsion hinges supported by two posts, so each mirror rotates along an axis in the mirror plane. By eliminating the horizontal displacement of individual mirror during the crossover transition, the gaps between adjacent mirrors in the array are significantly reduced, which results in a very high active reflection area fill-ratio of the SLM.

According to another embodiment of the present invention, a pair of vertical landing tips is fabricated on the surface of a control substrate. These vertical landing tips reduce the contact area of mirrors during the mechanical stops, and improve the reliability of mechanical landing operation. Most importantly, these landing tips enable a mirror landing separation by applying a sharp bipolar pulsing voltage on a common bias of the mirror array. The kinetic energy of the electromechanical shock generated by bipolar pulsing is converted into the elastic strain energy stored in the deformed mirror hinges and deformed landing tips, and is later released to spring and bounce the mirror separating the landing tips.

According to another embodiment of the present invention, the step electrode is raised above the surface of control substrate to narrow the air gap spacing between the mirrors and the addressing electrodes near hinge areas. Smaller effective air gap spacing, especially at a mechanical stop position, enhances electromechanical latching and improves electrostatic efficiency.

According to another embodiment of the present invention, coating an anti-stiction layer inside the device structures significantly reduces the surface contact adhesion between the mirror plate and micro landing tips.

According to another embodiment of the present invention, the materials of mirror plates, embedded torsion hinges, support posts, step electrodes, and landing tips are made of aluminum-silicon based electromechanical materials, such as aluminum, silicon, polysilicon, and aluminum-silicon alloys. The deposition is accomplished by physical vapor deposition (PVD) of magnetron sputtering a single target containing either or both aluminum and silicon in a controlled environment at a temperature below 500° C. Same structure layers may also be formed by plasma-enhanced chemical vapor deposition (PECVD).

According to another embodiment of the present invention, the materials of mirror plates 103, embedded torsion hinges 106, support posts 105, step electrodes 221, and landing tips 222 are made of refractory-metal based electromechanical materials, such as titanium, tantalum, tungsten, molybdenum, and their silicides. Refractory metal and their silicides are compatible with CMOS semiconductor processing and have relatively good mechanical properties. These materials can be deposited by PVD, by chemical vapor deposition (CVD), and by PECVD. Depositing a metallic thin-film, such as aluminum, gold or their alloys, on the surfaces of mirror plate, may enhance the optical reflectivity.

The invention provides a high contrast spatial light modulator for display and printing. The invention couples a high active reflection area fill-ratio and non-diffractive micro-mirror array with a high electrostatic efficiency and low surface adhesion control substrate.

BRIEF DESCRIPTION OF THE DRAWINGS

The following drawings, which are incorporated in and form a part of the specification, illustrate embodiments of the present invention and, together with the description, serve to explain the principles of the invention.

FIGS. 23–26 are cross-sectional side views of a part of a spatial light modulator; the figures illustrate one method for forming reflective mirrors and releasing individual mirrors of a micro-mirror array.

DESCRIPTION OF THE INVENTION

A high contrast spatial light modulator (SLM) for display and printing is fabricated by coupling a high active reflection area fill-ratio and non-diffractive micro-mirror array with a high electrostatic efficiency and low surface adhesion control substrate.

Figure 1A:
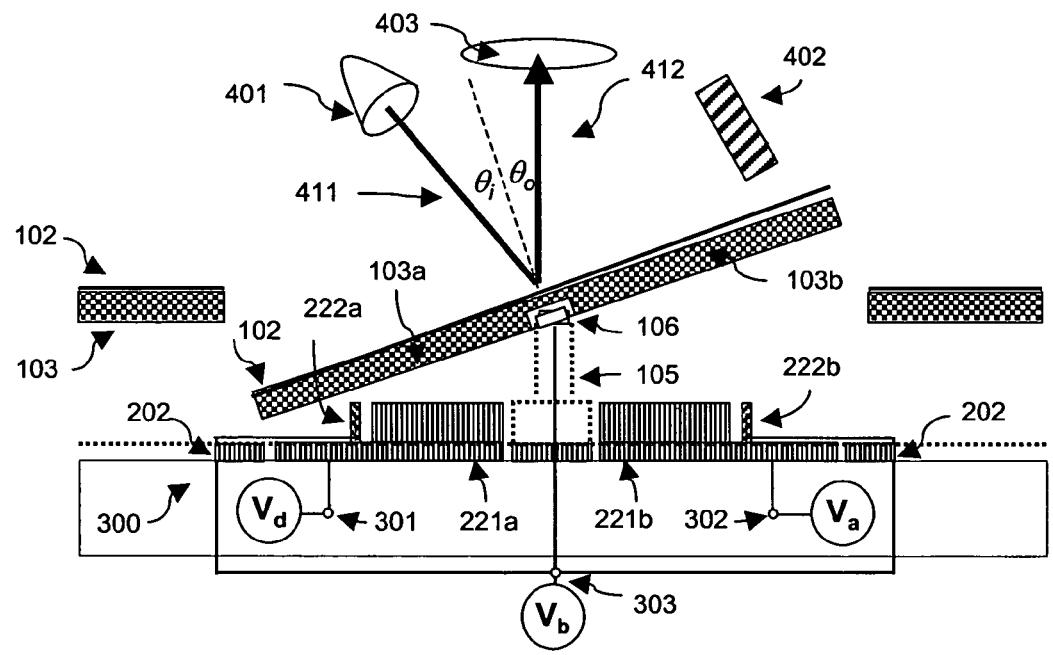
FIG. 1a is a cross-sectional view of a portion of a spatial light modulator deflecting light to an "on" state in accordance with an embodiment of the invention.

A cross-sectional view of a part of the spatial light modulator according to one embodiment of the present invention is shown in FIG. 1a, as the directional light 411 from illumination source 401 forms an angle of incidence θi. Deflected light 412 has an angle of θo, as measured in the normal direction of a micro-mirror array. In a digital operation mode, this configuration is commonly called the "on" position.

Figure 1B:
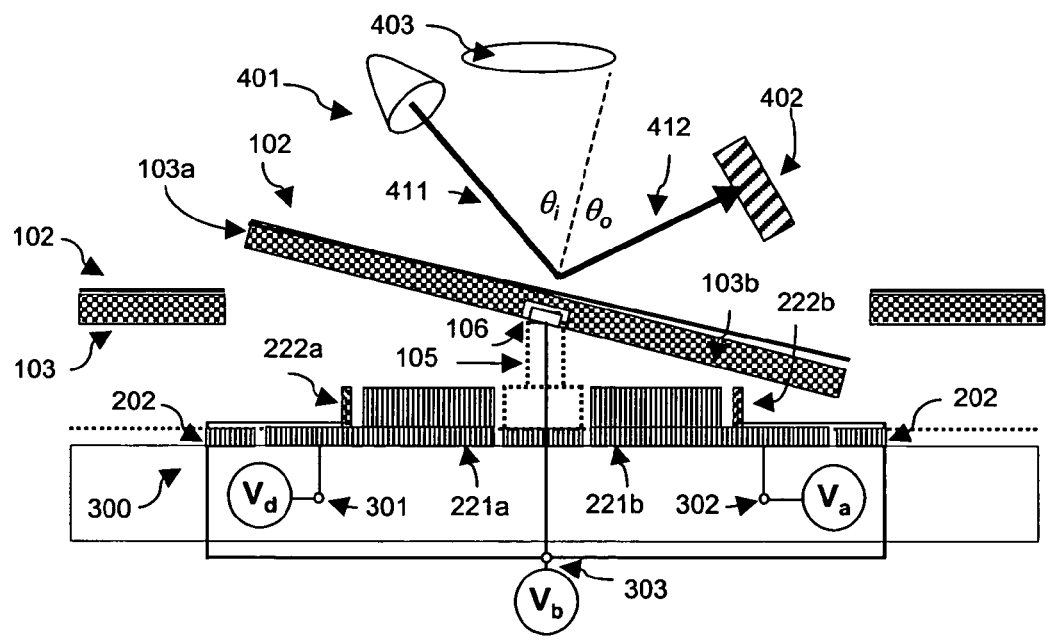
FIG. 1b is a cross-sectional view of a portion of a spatial light modulator deflecting light to an "off" state in accordance with an embodiment of the invention.

FIG. 1b shows a cross section view of the same part of the spatial light modulator while the mirror plate is rotated toward another electrode under the other side of the hinge 106. The directional light 411 and deflected light 412 form much larger angles θi and θo. These angles are a function of the dimensions of mirror plate 102 and the air gap spacing between the lower surfaces of mirror 103 and the landing tips 222. The deflected light 412 exits toward a light absorber 402.

According to another embodiment of the present invention, the high contrast SLM includes three major portions: the bottom portion including control circuitry, the middle portion with a set of step electrodes, micro landing tips, hinge support posts, and the upper portion covered with a set of mirrors with embedded torsion hinges and cavities.

The bottom portion is a wafer substrate 300 with addressing circuitry to selectively control the operation of each mirror in the micro-mirror array of the SLM. The addressing circuitry includes an array of memory cells and word-line/bit-line interconnects for communicating signals. The electrical addressing circuitry on a silicon wafer substrate may be fabricated using standard CMOS technology, and resembles a low-density memory array.

The middle portion of the high contrast SLM is formed by arrays of step electrodes 221, landing tips 222, hinge support posts 105, and a support frame 202. The multi-level step electrodes 221 of the present invention are designed to improve the capacitive coupling efficiency of electrostatic torques during the angular cross over transition. By raising the electrode 221 surfaces near the hinge 106 areas, the air gap spacing between the mirror plate 103 and the electrodes 221 is effectively narrowed. Since the electrostatic attractive force is inversely proportional to the square of the distance between the mirrors and electrodes, this effect becomes apparent when the mirror is tilted at its landing positions. When operating in an analog mode, highly efficient electrostatic couplings allow more precise and stable control of the tilting angles of the individual micro-mirrors in the spatial light modulator. In a digital mode, lower driving voltage potential is required for the addressing circuitry to operate. The height differences between the first level electrodes 221 may vary from 0.2 microns to 3 microns depends on the relative height of the air gap between the first level electrodes to the mirror plate.

On the surfaces of the control substrate, a pair of stationary vertical landing tips 222a and 222b is designed to have the same height as that of the second level electrodes 221 for manufacturing simplicity. A pair of stationary vertical tips 222a and 222b has two functions. The vertical tips provide a gentle mechanical touchdown for the mirror to land on each angular crossover transition. Adding a stationary landing tip 222 on the surface of the control substrate enhances the robotic operation and prolongs the reliability of the device. The second function of these vertical landing tips 222 is providing a mechanism to allow an ease of separation between the mirror 103 and its contact stop 222, which effectively eliminates the contact surface adhesion during digital operation of a SLM. For example, to initiate an angular crossover transition, a sharp bipolar pulse voltage Vb is applied on the bias electrode 303, typically connected to each mirror plate 103 through its embedded hinges 106 and support posts 105. The voltage potential established by the bipolar bias Vb enhances the electrostatic forces on both sides of the hinge 106. This strengthening is unequal on two sides at the landing position, due to the large difference in air gap spacing. Though the increases of bias voltages Vb on the lower surface of mirror plate 103a and 103b has less impact on which direction the mirror 102 will rotate toward, a sharp increase of electrostatic forces F on the whole mirror plate 102 provides a dynamic excitation by converting the electromechanical kinetic energy into an elastic strain energy stored in the deformed mirror hinges 106 and deformed landing tips 222a or 222b. After a bipolar pulse is released on the common bias Vb, the elastic strain energy of deformed landing tip 222a or 222b and deformed mirror hinges 106 is converted back to the kinetic energy of mirror plate as it springs and bounces away from the landing tip 222a or 222b. This perturbation of the mirror plate toward the quiescent state enables a much smaller address voltage potential Va for angular cross over transition of the mirror plate 103 from one state to the other.

Hinge support frame 202 on the surface of control substrate 300 is designed to strengthen the mechanical stability of the pairs of mirror support posts 105, and retain the electrostatic potentials locally. For simplicity, the height of support frames 202 is designed to be the same as the first level electrodes 221. With a fixed size of mirror plate 103, the height of a pair of hinge support posts 105 determines the maximum deflection angles θ of a micro-mirror array.

The upper portion of the high contrast SLM is fully covered by arrays of micro-mirrors with a flat optically reflective layer 102 on the upper surfaces and a pair of embedded torsion hinges 106 under the cavities in the lower portion of mirror plate 103. Torsion hinges 106 in the mirror plate 103 are fabricated to be part of the mirror plate 103 and are kept a minimum distance under the reflective surface to allow only a gap for a pre-determined angular rotation. By minimizing the distances between a hinge rotating axes 106 to the upper reflective surfaces 102, the spatial light modulator effectively eliminates the horizontal displacement of each mirror during an angular transition. According to the present invention, the gaps between adjacent mirrors in the array of SLM can be reduced to less than 0.2 microns to achieve the highest active reflection area fill-ratio of a micro-mirror array at the present time.

The materials used for micro deflection devices are preferably conductive, stable, with suitable hardness, elasticity, and stress. Ideally a single material, such as electromechanical materials, will cover both the stiffness of mirror plate 103 and plasticity of torsion hinges 106 having sufficient strength to deflect without fracturing. Furthermore, all the materials used in constructing the micro-mirror array are preferably processed under 400° C., a typical manufacturing process temperature to avoid damaging the pre-fabricated circuitries in the control substrate.

According to another embodiment of the present invention, the materials of mirror plates 103, embedded torsion hinges 106, and support posts 105 are made of aluminum-silicon based electromechanical materials, such as aluminum, silicon, polysilicon, and aluminum-silicon alloys, and their alloys. In one embodiment, deposition is accomplished by PVD magnetron sputtering of a single target containing either or both aluminum and silicon in a controlled chamber with temperature below 500° C. Same structure layers may also be formed by PECVD.

According to another embodiment of the present invention, the materials of mirror plates 103, embedded torsion hinges 106, and support posts 105 are made of refractory-metals based electromechanical materials, such as titanium, tantalum, tungsten, molybdenum, their silicides, and their alloys. Refractory metal and their silicides are compatible with CMOS semiconductor processing and have relatively good mechanical properties. These materials can be deposited by PVD, by CVD, and by PECVD. The optical reflectivity may be enhanced by further PVD depositing a layer of metallic thin-films 102, such as aluminum, gold, or their alloys depending on the applications on the surfaces of mirror plate 103.

To achieve high contrast ratio of the deflected video images, any scattered light from a micro-mirror array should be reduced or eliminated. Most common interferences come from the diffraction patterns generated by the scattering of illumination from the leading and trailing edges of individual mirrors. The solution to the diffraction problem is to weaken the intensity of a diffraction pattern and to direct the scattered light from the inactive area of each pixel to different directions away from the projection pupil. One method is directing the incident light 411 45° to the edges of the square shape mirror 102 pixels, which are sometimes called a diagonal hinge or diagonal illumination configuration.

Figure 2:
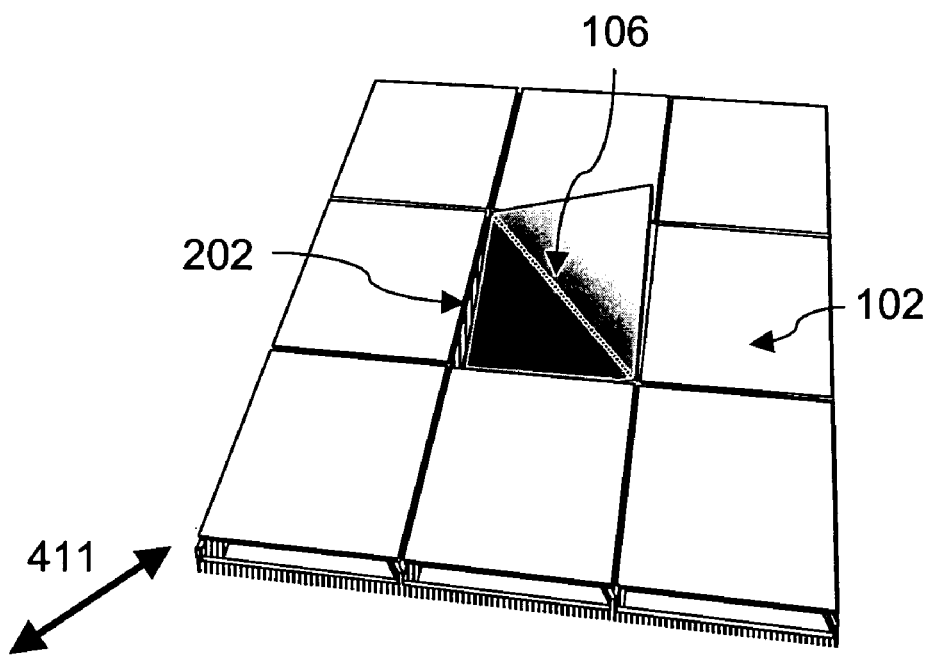
FIG. 2 is a perspective view of a portion of an array of rectangular shaped mirrors of a projection system with diagonal illumination utilized in accordance with an embodiment of the invention.

FIG. 2 is a perspective view showing the top of a part of the mirror array with each mirror 102 having a square shape; this mirror uses a diagonal illumination system. The hinges 106 of mirror in the array are fabricated in a diagonal direction along two opposite corners of the mirror and in perpendicular to the light of illumination 411. The advantage of a square shape mirror with a diagonal hinge axis is its ability to deflect the scattered light from the leading and trailing edges 45° away from the projection pupil 403. The disadvantage is that it requires the projection prism assembly system to be tilted to the edge of the SLM. The diagonal illumination has a low optical coupling efficiency when a conventional rectangular TIR prism system is used to separate the "on" and "off" light selected by each mirror 102. The twisted focusing spot requires an illumination larger than the size of rectangular micro-mirror array surfaces in order to cover all active pixel arrays. A larger rectangular TIR prism increases the cost, size, and the weight of the projection display.

Figure 3:
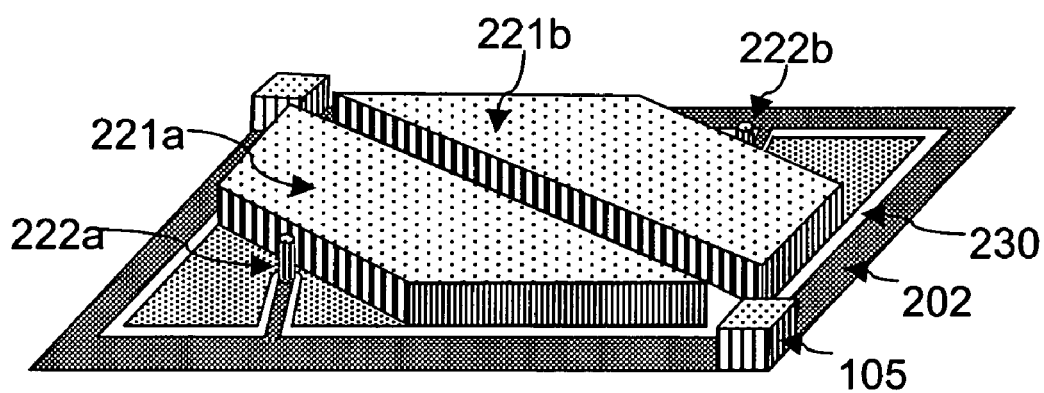
FIG. 3 is a perspective view showing the top of a part of a control circuitry substrate for a projection system with diagonal illumination utilized in accordance with an embodiment of the invention.

A perspective view of the top of a part of the control circuitry substrate for the projection system with diagonal illumination configuration is shown in FIG. 3. The pair of step electrodes 221 is arranged diagonal to improve the electrostatic efficiency of the capacitive coupling to the mirror plate 103. The two micro tips 222a and 222b act as the landing stops for a mechanical landing of mirrors 103 to ensure the precision of tilted angle θ and to overcome the contact stictions. Made of high spring constant materials, these micro tips 222a and 222b act as landing springs to reduce the contact area when mirrors are snapped down. The second function of these micro tips 222 at the edge of the two-level step electrodes 221 is their spring effect to facilitate separation from the mirror plates 103. When a sharp bipolar pulse voltage potential Vb is applied on the mirror 103 through a common bias 303 of the mirror array, a sharp increase of electrostatic forces F on the whole mirror plate 103 provides a dynamic excitation by converting the electromechanical kinetic energy into an elastic strain energy stored in the deformed mirror hinges 106. The elastic strain energy is converted back to the kinetic energy of mirror plate 103 as it springs and bounces away from the landing tip 222.

The periodic array of the straight or corner shape edges of the mirrors in prior art SLMs create diffraction patterns that reduce the contrast of projected images by scattering the illumination light 411 at a fixed angle. Curved leading and trailing edges of mirror in the array generate much weaker diffraction patterns due to the variation of scattering angles of the illumination light 411 on the edges of the mirrors. According to another embodiment of the present invention, the reduction of the diffraction intensity into the projection pupil 403 while still maintaining an orthogonal illumination optics system is achieved by replacing the straight or fixed angular corner shape edges of a rectangular shape mirror with at least one or a series of curvature shape leading and trailing edges with opposite recesses and extensions. Forming a curvature in the leading and trailing edges that is perpendicular to the incident illumination 411 weakens the diffraction intensity and reduces a large portion of scattering light diffracted directly into the projection system.

Orthogonal illumination has a higher optical system coupling efficiency, and requires a less expensive, smaller size, and lighter TIR prism. However, since the scattered light from both leading and trailing edges of a mirror is scattered directly into the projection pupil 403, it creates diffraction patterns that reduce the contrast ratio of a SLM.

Figure 4:
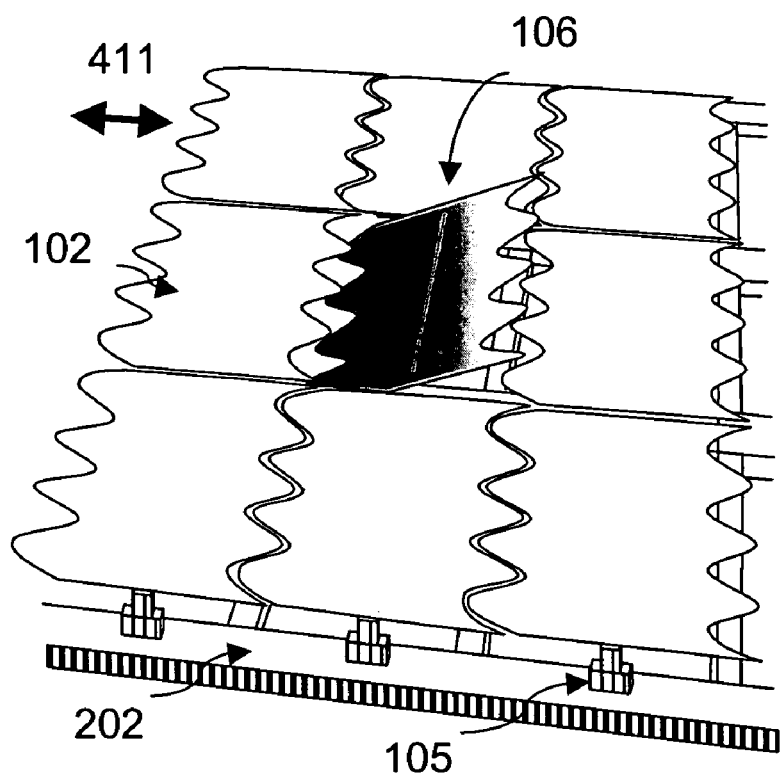
FIG. 4 is a perspective view showing a portion of a mirror array where each mirror has a series curved leading and trailing edges for use in a projection system with orthogonal illumination in accordance with an embodiment of the invention.

FIG. 4 shows a perspective view of the top of a mirror array for a projection system with orthogonal illumination. The embedded torsion hinges 106 are parallel to the leading and trailing edges of each mirror and are perpendicular to the illumination light 411. So the mirror pixels in the SLM are illuminated orthogonally. In FIG. 4, each mirror in the array has a series of curvatures in the leading edge extension and trailing edge recession. The principle is that a curvature edge weakens the diffraction intensity of scattered light and it further diffracts a large portion of scattered light at a variation of angles away from the optical projection pupil 403. The radius curvature of leading and trailing edges of each mirror r may vary depending on the numbers of curvatures selected. As the radius of curvature r becomes smaller, the diffraction reduction effect becomes more prominent. To maximize the diffraction reduction effects, according to another embodiment of the present invention, a series of small radius curvatures r are designed to form the leading and trailing edges of each mirror in the array. The number of curvatures may vary depending on the size of mirror pixels, with a 10 microns size square mirror pixel, two to four curvatures on each leading and trailing edge provides optimum results and low diffraction. In addition, this configuration is within current manufacturing capability.

Figure 5:
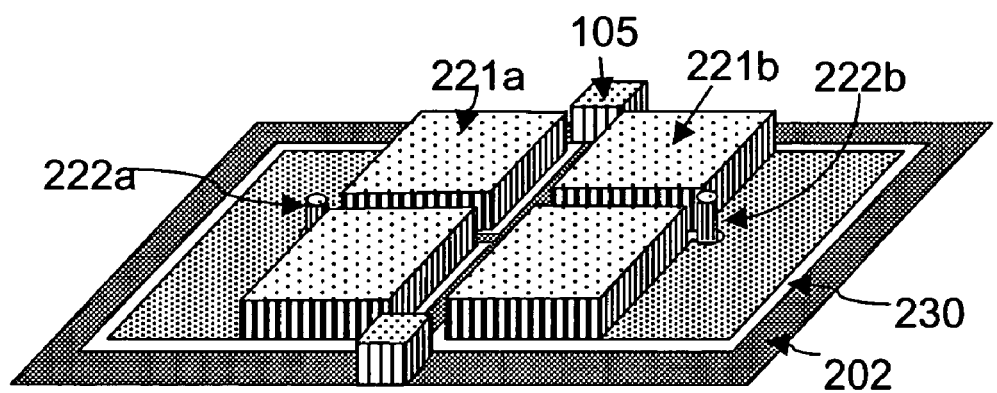
FIG. 5 is a perspective view of a control circuit substrate for a projection system with orthogonal illumination utilized in accordance with an embodiment of the invention.

FIG. 5 is a perspective view of a part of the control circuitry substrate 300 for a projection system with orthogonal illumination 411. Unlike conventional flat electrodes, the two-level step electrodes 221 raised above the surface of control substrate 300 near the hinge axis narrows the effective air gap spacing between the flat mirror plate 103 and the bottom electrodes 221, which significantly enhances the electrostatic efficiency of capacitive coupling of mirror plate 103. The number of levels for the step electrodes 221 can vary from one to ten. However, the larger the number of levels for step electrodes 221 the more complicated and costly it is to manufacture the devices. A more practical number is two or three. FIG. 5 also shows the mechanical landing stops made of tips 222 oriented in perpendicular to the surface of control substrate 300. These tips 222 provide a mechanical stop during the landing operation of angular crossover transitions. The tips 222 at the edge of step electrodes 221 act as landing tips to further overcome the contact surface adhesion. This low voltage driven and high efficiency micro-mirror array design allows an operation of a larger total deflection angle ($|\theta|>15°$) of micro-mirrors to enhance the brightness and contrast ratio of the SLM.

Figure 6:
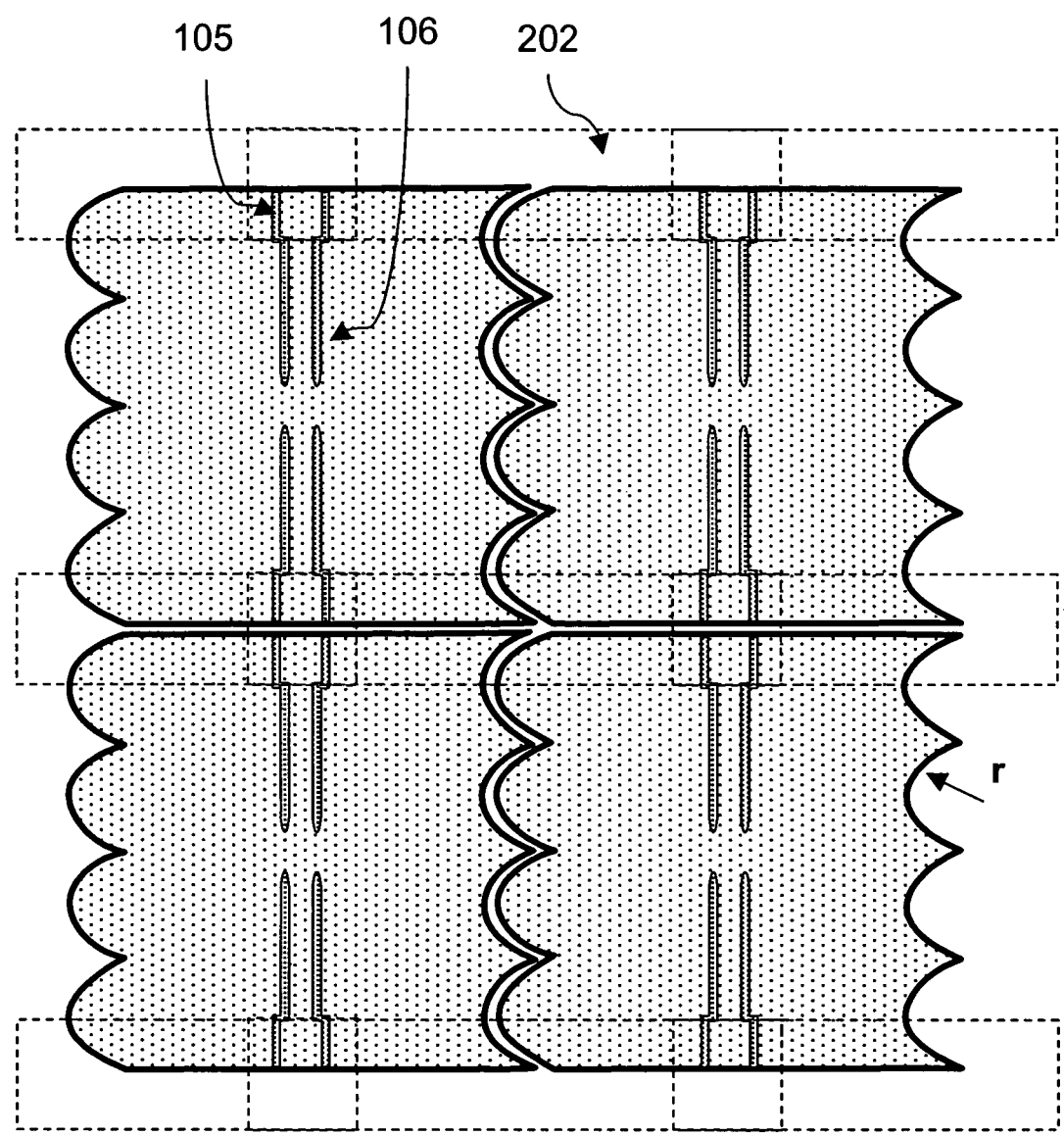
FIG. 6 is an enlarged backside view of a portion of a mirror array where each mirror has a series of curved leading and trailing edges for a projection system with orthogonal illumination.

Another advantage of this reflective spatial light modulator is that it produces the highest possible active reflection area fill-ratio by embedding the torsion hinge 106 under the cavities in the lower portion of mirror plate 103, which almost completely eliminates the horizontal displacement of mirror 103 during an angular crossover transition. An enlarged backside view of a part of the mirror array designed to reduce diffraction intensity using four-curvature leading and trailing edges is shown in FIG. 6 for a projection system with orthogonal illumination 411 configuration. Again, pairs of torsion hinges 106 are embedded under two cavities as part of the mirror lower portion 103 and are supported by a pair of support posts 105 on top of support frames 202. Hinge support post 105 has a width W in the cross-section much larger than the width of torsion hinge bar 106. Since the distance between the axis of hinge 106 to the reflective surfaces of the mirror is kept at a minimum, a high active reflection area fill-ratio is achieved by closely packed individual mirror pixels without worrying about the horizontal displacement. In one aspect of the present invention, mirror pixel size (a×b) is about 10 microns×10 microns, while the radius of curvature r is about 2.5 microns.

Figure 7:
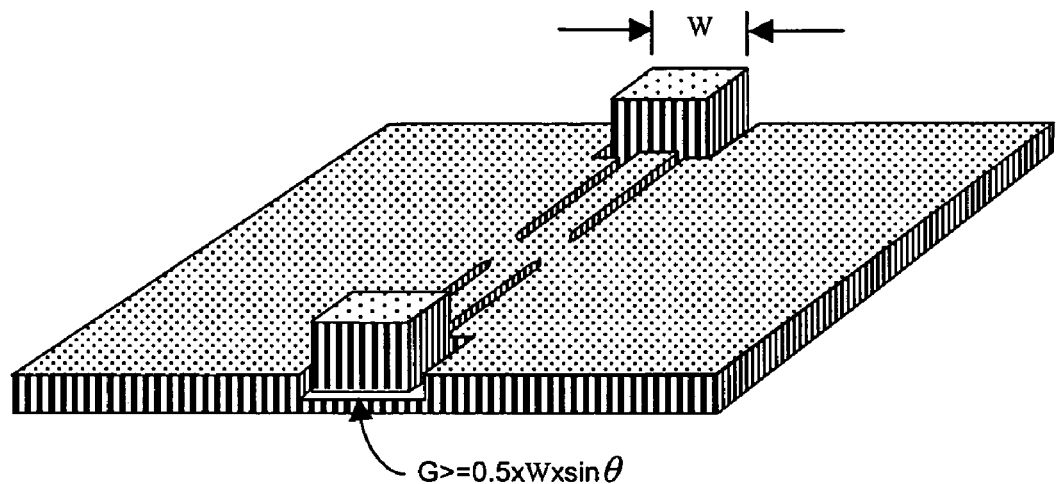
FIG. 7 is a perspective view of embedded torsion hinges and their support posts under cavities in the lower portion of a mirror plate.

FIG. 7 is an enlarged backside view of a part of the mirror plate showing the embedded torsion hinges 106 and their support posts 105 under cavities in the lower portion of a mirror plate 103. To achieve optimum performance, it is important to maintain a minimum air gap G in the cavity where the embedded torsion hinges 106 are created. The dimension of hinges 106 varies depending on the size of the mirrors 102. In one embodiment of the invention, the dimension of each torsion hinge 106 is about 0.1×0.2×3.5 microns, while the support post 105 has a square shape cross-section with each side W about 1.0 micron width. Since the top surfaces of support posts 105 are also under the cavities as lower part of the mirror plate 103, the air gap G in the cavity needs to be high enough to accommodate the angular rotation of mirror plate 103 without touching the larger hinge support posts 105 at a predetermined angle θ. In order for the mirror to rotate a pre-determined angle θ without touching the hinge support post 105, the air gap of the cavities where torsion hinges 106 are embedded must be larger than G=0.5×W×SIN (θ), where W is the cross section width of hinge support posts 105.

Figure 8:
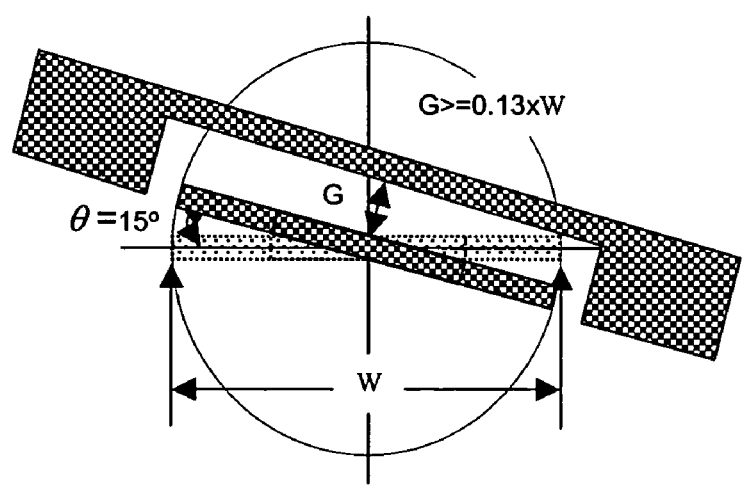
FIG. 8 is a diagram illustrating a minimum air gap spacing around an embedded torsion hinge of a mirror plate when rotated 15° in one direction.

FIG. 8 is a diagram illustrating a minimum air gap spacing G around the embedded torsion hinge 106 of a mirror plate 103 when rotated 15° in one direction. The calculation indicates the air gap spacing G of torsion hinge 106 in the cavity must be larger than G=0.13 W. If the width of each side W of a square shape hinge support post 105 is 1.0 micron, the air gap spacing G in the cavity should be larger than 0.13 microns. Without horizontal displacement during the angular transition operation, the horizontal gap between the individual mirrors in the micro-mirror array may be reduced to less than 0.2 microns, which leads to a 96% active reflection area fill-ratio of the SLM according to the present invention.

According to another embodiment of the present invention, fabrication of a high contrast spatial light modulator is divided into four sequential sections using standard CMOS technology. First, a control silicon wafer substrate is formed with support frames and arrays of first level electrodes on the surfaces and is connected to the memory cells in the addressing circuitry in the wafer, resembling a low-density memory array. Second, a set of second level electrodes, micro landing tips, and hinge support posts are formed on the surfaces of the control substrate. Third, a set of mirrors is formed with embedded hidden hinges on each pairs of support posts. At last, the fabricated wafer is separated into individual spatial light modulation device dies before finally removing the remaining sacrificial materials.

Figure 9:
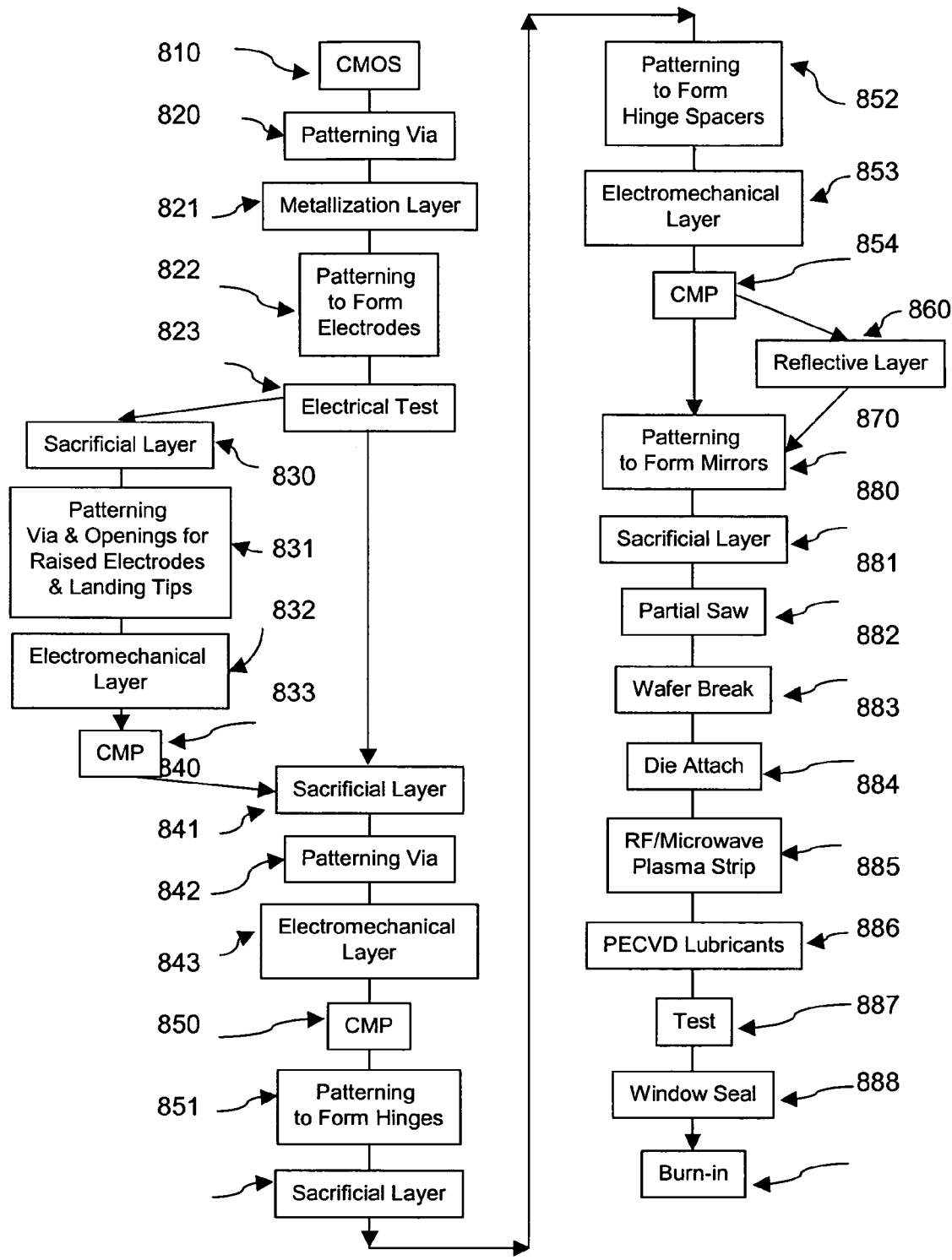
FIG. 9 is a manufacturing process flow diagram for a high contrast spatial light modulator configured in accordance with an embodiment of the invention.

One preferred embodiments of the manufacturing process flow diagram for a high contrast spatial light modulator is shown in FIG. 9. The manufacturing processes starts by fabricating a CMOS circuitry wafer having a set of memory cells and word-line/bit-line interconnection structures for communicating signals as the control substrate using common semiconductor technology 810. A set of first level electrodes and support frames are formed by patterning vias through the passivation layer of circuitry opening up the addressing nodes in the control substrate 820. To enhance the adhesion for a subsequent electromechanical layer, the via and contact openings are exposed to 2000 watts of RF or microwave plasma with 2 torr total pressures of a mixture of $O_2$, $CF_4$, and $H_2O$ gases at a ratio of 40:1:5 at about 250° C. for less than five minutes. An electromechanical layer is deposited by physical vapor deposition (PVD) or plasma-enhanced chemical vapor deposition (PECVD) depending on the materials selected filling vias and forming an electrode layer on the surface of control substrate 821. Then the electromechanical layer is patterned and etched anisotropically through to form a plurality of electrodes and support frames 822. The partially fabricated wafer is tested 823 to ensure the electrical functionality.

According to one preferred embodiment of the present invention, the electromechanical layer is aluminum metallization, which can take the form of a pure Al, titanium, tantalum, tungsten, molybdenum film, an Al/poly-Si composite, an Al—Cu alloy, or an Al—Si alloy. While each of these metallizations has slightly different etching characteristics, they all can be etched in similar chemistry in plasma etching of Al. With the present invention, a two step process is carried out to etch aluminum metallization layers anisotropically. First, the wafer is etched in inductive coupled plasma while flowing with BCl3, Cl2, and Ar mixtures at flow rates of 100 sccm, 20 sccm, and 20 sccm, respectively. The operating pressure is in the range of 10 to 50 mTorr, the inductive coupled plasma bias power is 300 watts, and the source power is 1000 watts. During the etching process, the wafer is cooled with a backside helium gas flow of 20 sccm at a pressure of 1 Torr. Since the Al pattern cannot simply be removed from the etching chamber into ambient atmosphere, a second oxygen plasma treatment step is performed to clean and passivate Al surfaces. In a passivation process, the surfaces of partially fabricated wafers is exposed to a 2000 watts of RF or microwave plasma with 2 torr pressures of a 3000 sccm of $H_2O$ vapor at about 250° C. temperatures for less than three minutes.

According to another embodiment of the present invention, the electromechanical layer is silicon metallization, which can take the form of a polysilicon, polycides, or a silicide. While each of these electromechanical layers has slightly different etching characteristics, they all can be etched in similar chemistry in plasma etching of polysilicon. Anisotropic etching of polysilicon can be accomplished with most Cl and F based feedstock, such as $Cl_2$, $BCl_3$, $CF_4$, $NF_3$, $SF_6$, HBr, and their mixtures with Ar, $N_2$, $O_2$, and $H_2$. In present invention, the poly silicon or silicide layer (WSix, or TiSix, or TaSi) is etched anisotropically in inductive decoupled plasma while flowing with $Cl_2$, $BCl_3$, HBr, and $HeO_2$ gases at flow rates of 100 sccm, 50 sccm, 20 sccm, and 10 sccm respectively. In another embodiment, the polycide layer is etched anisotropically in a reactive ion etch chamber flowing with $Cl_2$, $SF_6$, HBr, and $HeO_2$ gases at a flow rate of 50 sccm, 40 sccm, 40 sccm, and 10 sccm respectively. In both cases, the operating pressure is in the range of 10 to 30 mTorr, the inductive coupled plasma bias power is 100 watts, and the source power is 1200 watts. During the etching process, the wafer is cooled with a backside helium gas flow of 20 sccm at a pressure of 1 Torr. A typical etch rate can reach 9000 angstroms per minute.

In order to improve the electrostatic efficiency and reduce the stiction during the angular cross over transition of the micro-mirror arrays, a plurality of second level electrodes and micro landing tips are fabricated on the surfaces of control substrate. First, a layer of sacrificial materials is deposited with a predetermined thickness on the surface of partially fabricated wafer 830. If the sacrificial material is photoresist, the layer is spin coated on the surface. If it is organic polymer, the layer is deposited by PECVD. To prepare for the subsequent build up, the sacrificial layer has to be hardened by exposing the layer to ultraviolet light, then exposing to a $CF_4$ plasma for about three minutes, then baking the layer at about 150° C. for about two hours, finally exposing the layer to oxygen plasma for about one minute. Second, the sacrificial layer is patterned to form via and contact openings for a plurality of second level electrodes, landing tips, and support posts 831. Third, a second electromechanical layer is deposited by PVD or PECVD depending on the materials selected forming a plurality of second level electrodes, landing tips, and support posts 832. Finally, the second electromechanical layer is planarized to a predetermined thickness by chemical mechanical polishing (CMP) 833. A preferred height of second level electrodes and micro landing tips is less than one micron.

Once the raised multi-level step electrodes and micro landing tips are formed on the CMOS control circuitry substrate, a plurality of mirrors with embedded hidden hinges on each pair of support posts are fabricated. The processes started with depositing sacrificial materials with a predetermined thickness on the surface of partially fabricated wafer 840. Then sacrificial layer is patterned to form vias for a plurality of hinge support posts 841. The sacrificial layer is further hardened before a deposition of electromechanical materials by PVD or PECVD depending on materials selected to fill vias and form a thin layer for torsion hinges and part of mirrors 842. Chemical Mechanical Polishing (CMP) 843 planarizes the electromechanical layer to a predetermined thickness. The electromechanical layer is patterned by a plurality of openings to form a plurality of torsion hinges 850. To form a plurality of cavities in the lower portion of mirror plate and torsion hinges embedded under the cavity, sacrificial materials is again deposited to fill the opening gaps around the torsion hinges and to form a thin layer with a predetermined thickness on top of hinges 851. A preferred thickness is slightly larger than $G=0.5 \times W \times SIN(\theta)$, where W is the cross section width of hinge support posts 105. The sacrificial layer is patterned to form a plurality of spacers on top of each torsion hinge 852. More electromechanical materials are deposited to cover the surface of partially fabricated wafer 853. The electromechanical layer is planarized to a predetermined thickness by CMP 854 before patterning a plurality of openings to form a plurality of air gaps between individual mirror plates 870. The reflectivity of mirror surface may be enhanced by a PVD deposition of 400 angstroms or less thickness reflective layer selected from the group consisting of aluminum, gold, and combinations thereof 860.

To separate the fabricated wafer into individual spatial light modulation device dies, a thick layer of sacrificial materials is deposited to cover the fabricated wafer surfaces for protection 880. Then the fabricated wafer is partially sawed 881 before separating into individual dies by scribing and breaking 882. The spatial light modulator device die is attached to the chip base with wire bonds and interconnects 883 before a RF or microwave plasma striping of the remaining sacrificial materials 884. The SLM device die is further lubricated by exposure to a PECVD coating of lubricants in the interfaces between the mirror plate and the surface of electrodes and landing tips 885 before electro-optical functional test 886. Finally, the SLM device is hermetically sealed with a glass window lip 887 and sent to a burn-in process for reliability and robust quality control 888.

One of the major problems in the digital operation of micro-mirror array is the high stiction of a micro-mirror at a mechanical landing position. The surface contact adhesion could increase beyond the electrostatic force of control circuitry, causing device failure from stiction in a moist environment. To reduce the contact adhesion between the mirror plate 103 and landing tips 222, and protect the mechanical wear degradation of interfaces during the touch and impact of angular cross over transition, a thin lubricated coating is deposited on the lower portion of mirror plate 103 and on the surface of electrodes 221 and landing tips 222. The lubricants chosen should be thermally stable, low vapor pressure, and non-reactive with metallization and electromechanical materials that formed the micro-mirror array devices.

In the embodiment of the presentation invention, fluorocarbon thin film is coated to the surfaces of the lower portion of mirror plate and on the surface of electrodes and landing tips. The SLM device die is exposed to plasma of fluorocarbons, such as $CF_4$, at a substrate temperature of about 200° C. for less than five minutes. The fluorine on the surfaces 103 serves to prevent adherence or attachment of water to the interfaces of mirror plate and the underneath electrodes and landing tips, which eliminates the impact of humidity in the sticion of a mirror during landing operation. Coating fluorocarbon film in the interfaces between the mirror plate 103 and underneath electrodes 221 and landing tips 222 provides a sufficient repellent performance to water due to the fluorine atoms existing near the exposed surfaces.

In another embodiment of the present invention, a perfluoropolyether (PFPE) or a mixture of PFPE or a phosphazine derivative is deposited by PECVD in the interfaces between the mirror plate 103 and underneath electrodes 221 and landing tips 222 at a substrate temperature of about 200° C. for less than five minutes. PFPE molecules have an aggregate vapor pressure in the range of $1 \times 10^{-6}$ to $1 \times 10^{-11}$ atm. The thickness of lubricant film is less than 1000 angstroms. To improve the adhesion and lubricating performance on the surface of a metallization or an electromechanical layer, phosphate esters may be chosen because of their affinity with the metallic surface.

Figure 18:
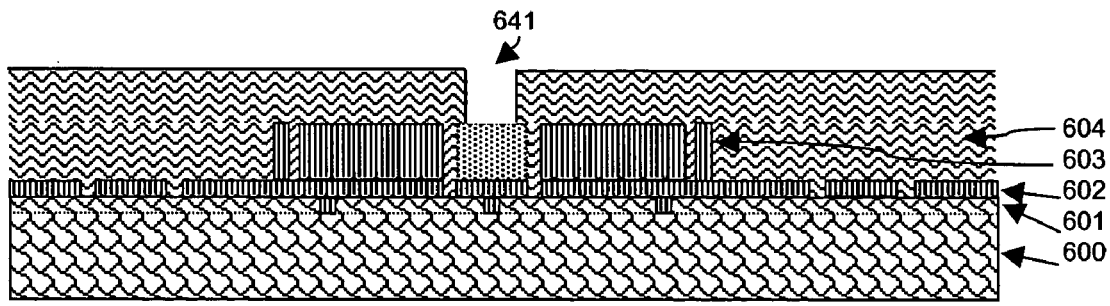
FIGS. 18–20 are cross-sectional side views of a part of a spatial light modulator; the figures illustrate one method for fabricating a plurality of torsion hinges and supports on the support frame.
Figure 19:
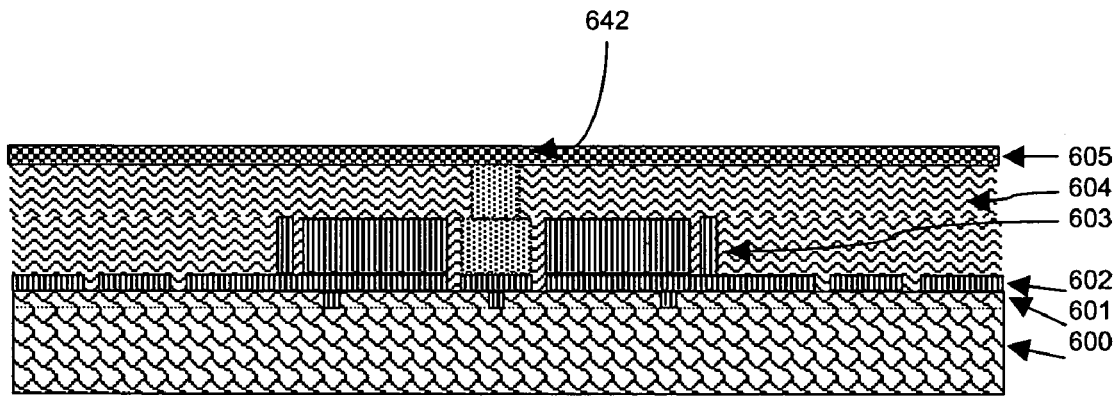
Figure 20:
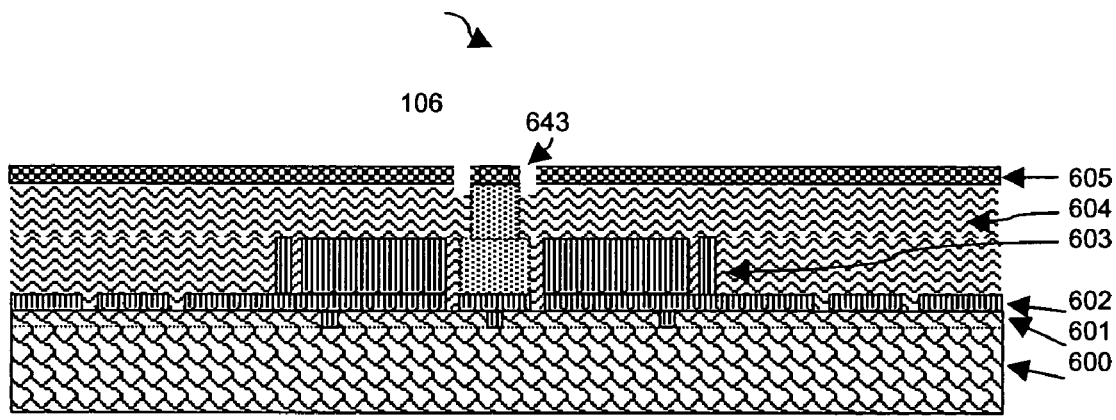
Figure 21:
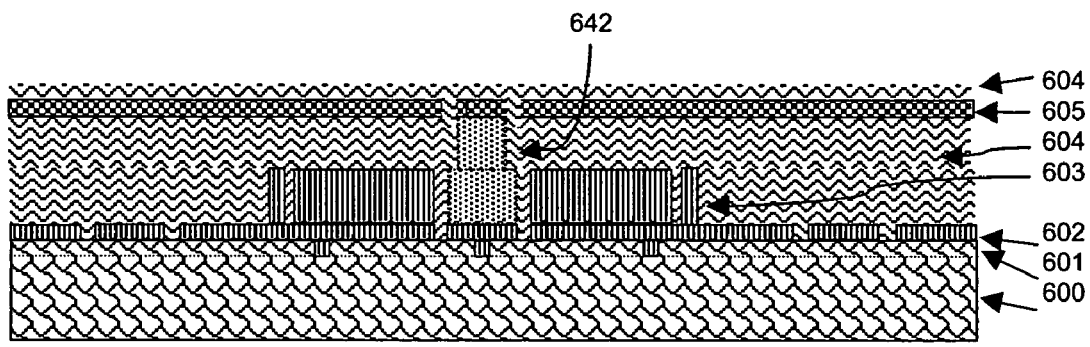
FIGS. 21–23 are cross-sectional side views of a part of a spatial light modulator; the figures illustrate one method for fabricating a mirror plate with embedded hidden hinges.
Figure 22:
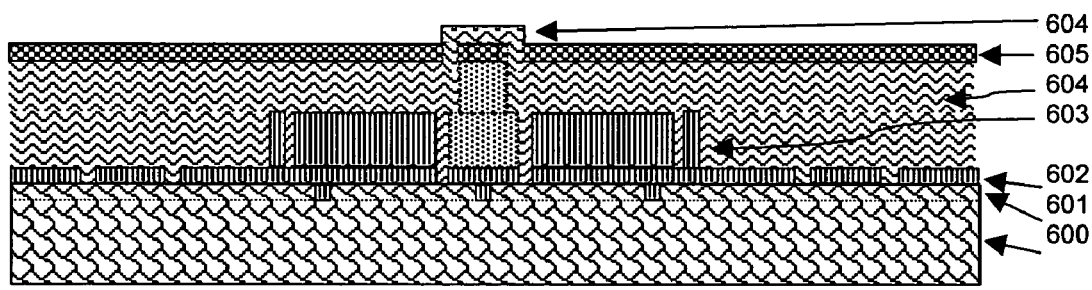
Figure 23:
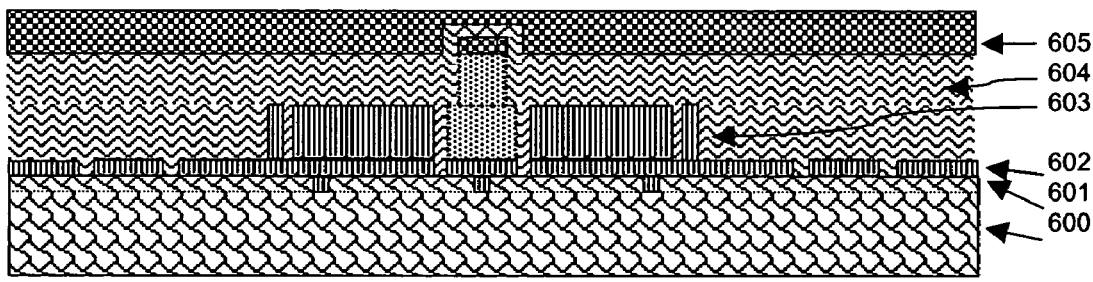

A more detailed description of the process of fabricating a high contrast spatial light modulator is illustrated in a series of cross-sectional diagrams. FIG. 10 to FIG. 13 are cross-sectional side views of a part of a spatial light modulator illustrating one method for fabricating a plurality of support frames and the first level electrodes connected to the memory cells in the addressing circuitry. FIGS. 14–17 are cross section side views of a part of a spatial light modulator illustrating one method for fabricating a plurality of support posts, second level electrodes, and landing tips on the surface of control substrate. FIGS. 18 to 20 are cross-sectional side views of a part of a spatial light modulator illustrating one method for fabricating a plurality of torsion hinges and supports on the support frame. FIGS. 21 to 23 are cross-sectional side views of a part of a spatial light modulator illustrating one method for fabricating a mirror plate with a plurality of embedded hidden hinges. FIGS. 23 to 26 are cross-sectional side views of a part of a spatial light modulator illustrating one method for forming the reflective mirrors and releasing individual mirrors of a micro-mirror array.

Figure 10:
FIGS. 10–13 are cross-sectional side views of a part of a spatial light modulator; the figures illustrate one method for fabricating support frames and first level electrodes connected to memory cells in addressing circuitry.
Figure 11:
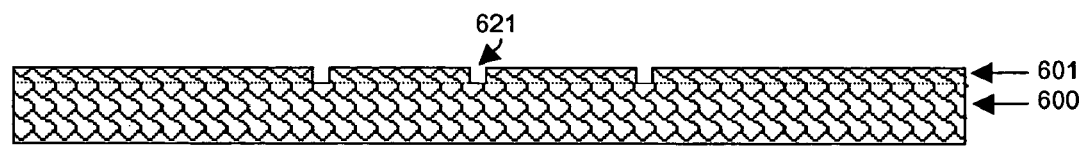

FIG. 10 is a cross-sectional view that illustrates the control silicon wafer substrate 600 after using standard CMOS fabrication technology. In one embodiment, the control circuitry in the control substrate includes an array of memory cells, and word-line/bit-line interconnects for communication signals. There are many different methods to make electrical circuitry that performs the addressing function. DRAM, SRAM, and latch devices commonly known all perform an addressing function. Since the mirror plate 102 area may be relatively large on semiconductor scales (for example, the mirror plate 102 may have an area of larger than 100 square microns), complex circuitry can be manufactured beneath micro-mirror 102. Possible circuitry includes, but is not limited to, storage buffers to store time sequential pixel information, and circuitry to perform pulse width modulation conversions.

In a typical CMOS fabrication process, the control silicon wafer substrate is covered with a passivation layer 601 such as silicon oxide or silicon nitride. The passivated control substrate 600 is patterned and etched anisotropically to form via 621 connected to the word-line/bit-line interconnects in the addressing circuitry, shown in FIG. 11. According to another embodiment of the present invention, anisotropic etching of dielectric materials, such as silicon oxides or silicon nitrides, is accomplished with $C_2F_6$ and $CHF_3$ based feedstock and their mixtures with He and $O_2$. One preferred high selectivity dielectric etching process flows $C_2F_6$, $CHF_3$, He, and $O_2$ at a ratio of 10:10:5:2 mixtures at a total pressure of 100 mTorr with inductive source power of 1200 watts and a bias power 600 watts. The wafers are then cooled with a backside helium gas flow of 20 sccm at a pressure of 2 torr. A typical silicon oxide etch rate can reach 8000 angstroms per minute.

Figure 12:
Figure 13:
Figure 14:
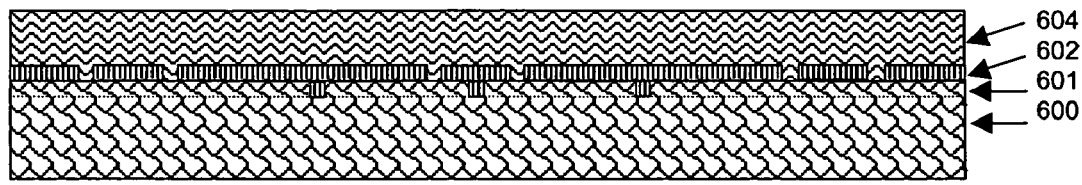
FIGS. 14–17 are cross-sectional side views of a part of a spatial light modulator; the figures illustrate one method for fabricating support posts, second level electrodes, and landing tips on the surface of a control substrate.

Next, FIG. 12 shows that an electromechanical layer 602 is deposited by PVD or PECVD depending on the electromechanical materials selected. This electromechanical layer 602 is patterned to define hinge support frames 202 and the first level electrodes 221 corresponding to each micro-mirror 102, shown in FIG. 12. The patterning electromechanical layer 602 is performed by the following processes. First, a layer of photoresist is spin coated to cover the substrate surface. Then photoresist layer is exposed to standard photolithography and is developed to form predetermined patterns. The electromechanical layer is etched anisotropically through to form a plurality of vias and openings. Once vias and openings are formed, removing the residues from the surfaces and inside the openings cleans the partially fabricated wafer. This is accomplished by exposing the patterned wafer to a 2000 watts of RF or microwave plasma with 2 torr total pressures of a mixture of $O_2$, $CF_4$, and $H_2O$ gases at a ratio of 40:1:5 at about 250° C. for less than five minutes. Finally, the surfaces of the electromechanical layer are passivated by exposure to 2000 watts of RF or microwave plasma with 2 torr pressures of a 3000 sccm of $H_2O$ vapor at about 250° C. temperatures for less than three minutes.

The next step is forming a plurality of second level electrodes 221, micro landing tips 222, and support pots 105 on the surface of partially fabricated wafer. A micron thick sacrificial material 604 is deposited on the substrate surface, which can be spin coated photoresist or PECVD of organic polymers, shown in FIG. 14. The sacrificial layer 604 is hardened by a series thermal and plasma treatments to transform structure of materials from a hydrophobic state to hydrophilic state of polymers. First, the sacrificial layer 604 is exposed to ultraviolet light, then to a $CF_4$ plasma for about three minutes, followed by baking sacrificial layer at about 150° C. for about two hours before exposing sacrificial layer to oxygen plasma for about one minute. In some cases, implanting the sacrificial layer with KeV energy of silicon, boron, or phosphors ions further hardens the sacrificial layers 604.

Figure 15:
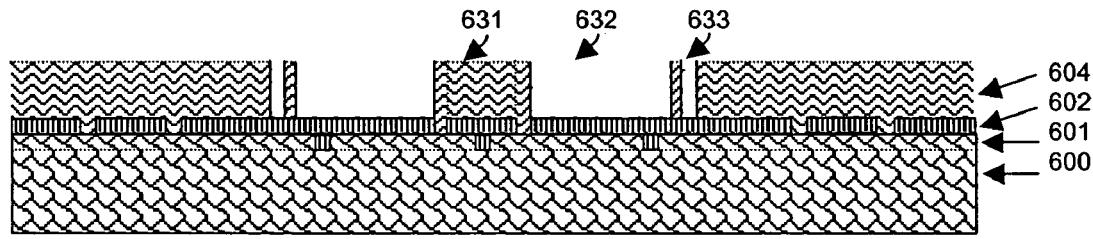
Figure 16:
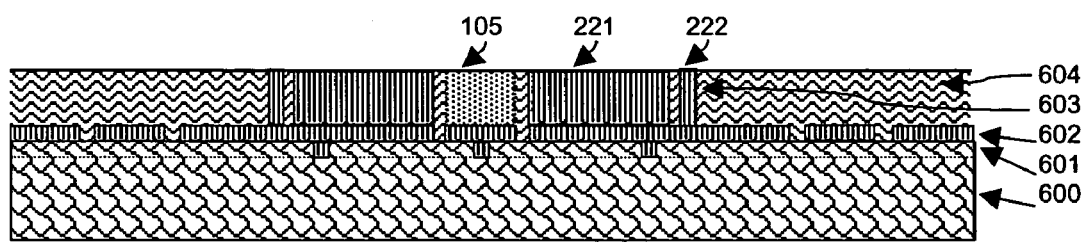

Then, sacrificial layer 604 is patterned to form a plurality of via and contact openings for second level electrodes 632, micro landing tips 633, and support pots 631 as shown in FIG. 15. To enhance the adhesion for a subsequent electromechanical layer, the via and contact openings are exposed to a 2000 watts of RF or microwave plasma with 2 torr total pressures of a mixture of $O_2$, $CF_4$, and $H_2O$ gases at a ratio of 40:1:5 at about 250° C. temperatures for less than five minutes. Electromechanical material 603 is then deposited to fill via and contact openings. The filling is done by either PECVD or PVD depending on the materials selected. For the materials selected from the group consisting of aluminum, titanium, tungsten, molybdenum, their alloys, PVD is a common deposition method in the semiconductor industry. For the materials selected from the group consisting of silicon, polysilicon, silicide, polycide, tungsten, their combinations, PECVD is chosen as a method of deposition. The partially fabricated wafer is further planarized by CMP to a predetermined thickness slightly less than one micron, as shown in FIG. 16.

Figure 17:
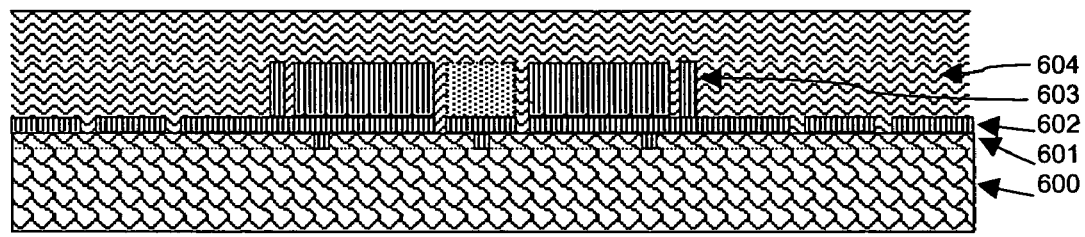

After the CMP planarization, FIG. 17 shows that another layer of sacrificial materials 604 is spin coated on the blanket surface to a predetermined thickness and hardened to to form the air gap spacer under the torsion hinges. The sacrificial layer 604 is patterned to form a plurality of via or contact openings for hinge support posts 641 as shown in FIG. 18. In FIG. 19, electromechanical material is deposited to fill vias and form a torsion hinge layer 605 on the surface. This hinge layer 605 is then planarized by CMP to a predetermined thickness. The thickness of electromechanical layer 605 formed here defines the thickness of torsion hinge bar and the mechanical performance of the mirror.

The partially fabricated wafer is patterned and etched anisotropically to form a plurality of torsion hinges 106 in the electromechanical layers 605 as shown in FIG. 20. More sacrificial materials 604 are deposited to fill the openings 643 surrounding each hinge and to form a thin layer 604 with predetermined thickness on the surface, as shown in FIG. 21. The thickness of this layer 604 defines the height of the spacers on top of each torsion hinge 106. The sacrificial layer 604 is then patterned to form a plurality of spacers on top of each torsion hinge 106, as shown in FIG. 22. Since the top surfaces of support posts 642 are also under the cavities as lower parts of the mirror plate 103, the air gap G in the cavity needs to be high enough to accommodate the angular rotation of mirror plate 103 without touching the larger hinge support posts 105 at a pre-determined angle θ. In order for the mirror to rotate a pre-determined angle θ without touching the hinge support post 105, the air gap of the cavities where torsion hinges 106 are embedded must be larger than $G=0.5 \times W \times SIN(\theta)$, where W is the cross section width of hinge support posts 105. In the present invention, each mirror in the array may rotate 15° in each direction. The calculation indicates the air gap spacing G of torsion hinge 106 in the cavity must be larger than $G=0.13 W$. If width of each side W of a square shape hinge support post 105 is 1.0 micron, the air gap spacing G in the cavity should be larger than 0.13 microns.

Figure 24:
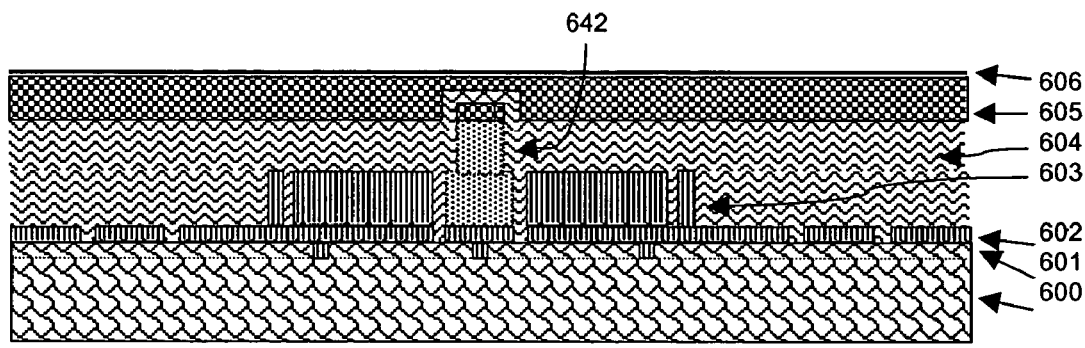
Figure 25:
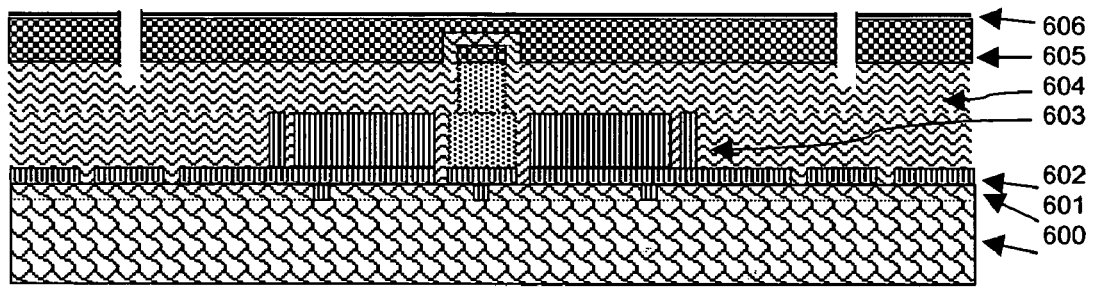

To form a mirror with embedded torsion hinges 106 under each cavity in the lower portion of mirror plate 103, more electromechanical materials 605 is deposited to cover a plurality of sacrificial spacers, as shown in FIG. 23. In some cases, a chemical-mechanical-polished (CMP) process is added to ensure a flat reflective surface of electromechanical layer 605 has been achieved before etching to form individual mirrors. The thickness of the total electromechanical layer 605 will ultimately be the approximate thickness of the mirror plate 103 eventually fabricated. In FIG. 23, the surface of a partially fabricated wafer is planarized by CMP to a predetermined thickness of mirror plate 103. In present invention, the thickness of the mirror plate 605 is between 0.3 microns to 0.5 microns. If the electromechanical material is aluminum or its metallic alloy, the reflectivity of mirror is high enough for most display applications. For some other electromechanical materials or for other applications, the reflectivity of the mirror surface may be enhanced by deposition of a reflective layer 606 of 400 angstroms or less thickness selected from the group consisting of aluminum, gold, their alloys, and combinations, as shown in FIG. 24. The reflective surface 606 of electromechanical layer is then patterned and etched anisotropically through to form a plurality of individual mirrors, as shown in FIG. 25.

Figure 26:
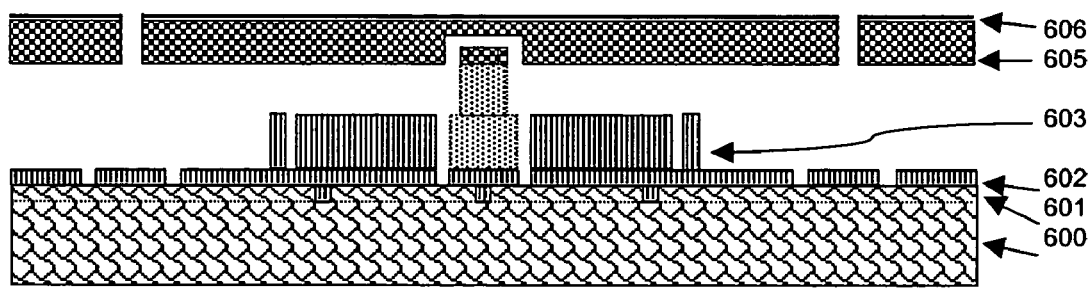

FIG. 26 shows the remaining sacrificial materials 604 are removed and residues are cleaned through a plurality of air gaps between each individual mirrors in the array to form a functional micro-mirror array based spatial light modulation. In a real manufacturing environment, more processes are required before delivering a functional spatial light modulator for a video display application. After reflective surface 606 of electromechanical layer 605 is patterned and etched anisotropically through to form a plurality of individual mirrors, more sacrificial materials 604 are deposited to cover the surface of the fabricated wafer. With its surface protected by a layer of sacrificial layer 604, the fabricated wafer goes through common semiconductor packaging processes to form individual device dies. In a packaging process, the fabricated wafer is partially sawed 881 before separated into individual dies by scribing and breaking 882. The spatial light modulator device die is attached to the chip base with wire bonds and interconnects 883 before striping the remaining sacrificial materials 604 and its residues in the structures 884. In one embodiment, the cleaning is accomplished by exposing the patterned wafer to a 2000 watts of RF or microwave plasma with 2 torr total pressures of a mixture of $O_2$, $CF_4$, and $H_2O$ gases at a ratio of 40:1:5 at about 250° C. for less than five minutes. Finally, the surfaces of electromechanical and metallization structures are passivated by exposing to a 2000 watts of RF or microwave plasma with 2 torr pressures of a 3000 sccm of $H_2O$ vapor at about 250° C. temperatures for less than three minutes.

The SLM device die is further coated with an anti-stiction layer inside the opening structures by exposure to a PECVD of fluorocarbon at about 200° C. for less than five minutes 885 before plasma cleaning and electro-optical functional test 886. Finally, the SLM device is hermetically sealed with a glass window lip 887 and sent to burn-in process for reliability and robust quality control 888.

Although the invention has been particularly shown and described with reference to multiple embodiments, it will be understood by persons skilled in the relevant art that various changes in form and details can be made therein without departing from the spirit and scope of the invention. For example, the same 3-dimensional multi-layer structures may be constructed by patterning and etching the electromechanical layers, rather than patterning the sacrificial layers and etching via.

Aside from video displays and printing, the spatial light modulator described here is also useful in other applications, such as in maskless photolithography, where the spatial light modulator directs light to develop deposited photoresist, and in photonic switches, where the optical signals are directed and distributed among fiber optical networks.

What is claimed is:

1. A spatial light modulator comprising:
   a control substrate having an upper portion with a plurality of electrodes connected to functional circuitry;
   a plurality of mirror plates, each mirror plate having an upper reflective surface and a lower conductive portion having a cavity recessed into said lower conductive portion and a torsion hinge positioned in said cavity; and
   a plurality of binge support posts on top of said control substrate, wherein each hinge support post is located completely beneath an associated mirror plate of the plurality of mirror plates, each support post supporting an associated torsion hinge to facilitate mirror plate rotation about an axis of said associated torsion hinge.

2. The spatial light modulator set forth in claim 1, wherein said functional circuitry includes a series of memory cells and word-line/bit-line interconnection structures for communicating signals.

3. The spatial light modulator set forth in claim 1, wherein each electrode is a step electrode having a portion raised above the surface of said control substrate to narrow the distance between each mirror plate and said control substrate beneath said mirror plate.

4. The spatial light modulator set forth in claim 1, wherein said control substrate further comprises a plurality of landing tips oriented perpendicular to the surface of said control substrate to limit the motion of each mirror plate.

5. The spatial light modulator set forth in claim 1, formed from one or more materials selected from the group consisting of aluminum, silicon, polysilicon, aluminum-silicon alloys, and combinations thereof.

6. The spatial light modulator set forth in claim 1, including one or more materials selected from the group consisting of titanium, tantalum, tungsten, molybdenum, alloys thereof, and silicides thereof.

7. The spatial light modulator set forth in claim 1, wherein said mirror plates include a reflective layer having a thickness of approximately 400 angstroms or less formed from one or more materials selected from the group consisting of aluminum, gold, and combinations thereof.

8. The spatial light modulator set forth in claim 1, wherein each mirror plate of said plurality of mirror plates is separated from all adjacent minor plates by a space of 0.2 microns or less.

9. The spatial light modulator set forth in claim 1, wherein each of said recessed cavities has a height defined by the distance between the cavity in the lower conductive portion and the torsion hinge positioned directly beneath said cavity, where said height is at least one half of the width of said hinge support post multiplied by the sine of the greatest deflection angle through which said mirror plate can rotate.

10. The spatial light modulator set forth in claim 1, wherein each said mirror plate comprises
    a leading edge, a trailing edge, and at least one side edge; and at least a portion of said leading edge or said trailing edge lies along a plurality of curves having radius r, wherein the at least one side edge has a side edge length of a and said radius r is less than a.

11. The spatial light modulator set forth in claim 1, wherein at least one of said plurality of electrodes is a step electrode having a plurality of levels, each level having a distinct height above the said control substrate.

12. The spatial light modulator set forth in claim 11, wherein said at least one step electrode has either two or three levels, each level having a distinct height above said control substrate.

13. A spatial light modulator comprising:
a control substrate having an upper portion with a plurality of electrodes connected to functional circuitry;
a plurality of mirror plates, each mirror plate having an upper reflective surface and a lower conductive portion having a cavity and a hinge in said cavity, wherein each said mirror plate comprises
a leading edge, a trailing edge, and at least one side edge, wherein at least a portion of said leading edge or said trailing edge lies along a plurality of curves having radius r, wherein the at least one side edge has a side edge length of a and said radius r is less than a; and
a plurality of hinge support posts on top of said control substrate, wherein a hinge support post supports a corresponding hinge to facilitate mirror plate rotation about an axis of said hinge.

14. The spatial light modulator set forth in claim 13, wherein both said leading edge and said trailing edge lie along a plurality of curves.

15. The spatial light modulator set forth in claim 14, wherein said leading edge is parallel to said trailing edge at every point along said curves.

16. The spatial light modulator set forth in claim 13, wherein said mirror plate side edge length is about 10 microns.

17. The spatial light modulator set forth in claim 16, wherein said curve radius r is 2.5 microns.

18. The spatial light modulator set forth in claim 13, wherein said curve radius r is 2.5 microns.

19. The spatial light modulator set forth in claim 13, wherein the upper reflective surface of said each mirror plate further comprises a layer of thin metallic film.

20. The spatial light modulator set forth in claim 13, wherein said spatial light modulator is formed at least in part from a refractory metal.

21. A spatial light modulator comprising:
a control substrate having an upper portion with a plurality of electrodes connected to functional circuitry;
a plurality of mirror plates, each mirror plate having an upper reflective surface and a lower conductive portion with a recess therein and a torsion hinge positioned in the recess, wherein there is a gap between adjacent mirror plates, the gap being less than 0.2 microns; and
a plurality of hinge support posts on top of the control substrate, wherein each hinge support post is not located in the gap, each support post supporting an associated torsion binge to facilitate mirror plate rotation about an axis of the associated torsion hinge.

* * * * *

UNITED STATES PATENT AND TRADEMARK OFFICE
CERTIFICATE OF CORRECTION

PATENT NO. : 7,167,298 B2  Page 1 of 1
APPLICATION NO. : 10/974468
DATED : January 23, 2007
INVENTOR(S) : Shaoher X. Pan It is certified that error appears in the above-identified patent and that said Letters Patent is hereby corrected as shown below:

Please replace Figure 1A, with:

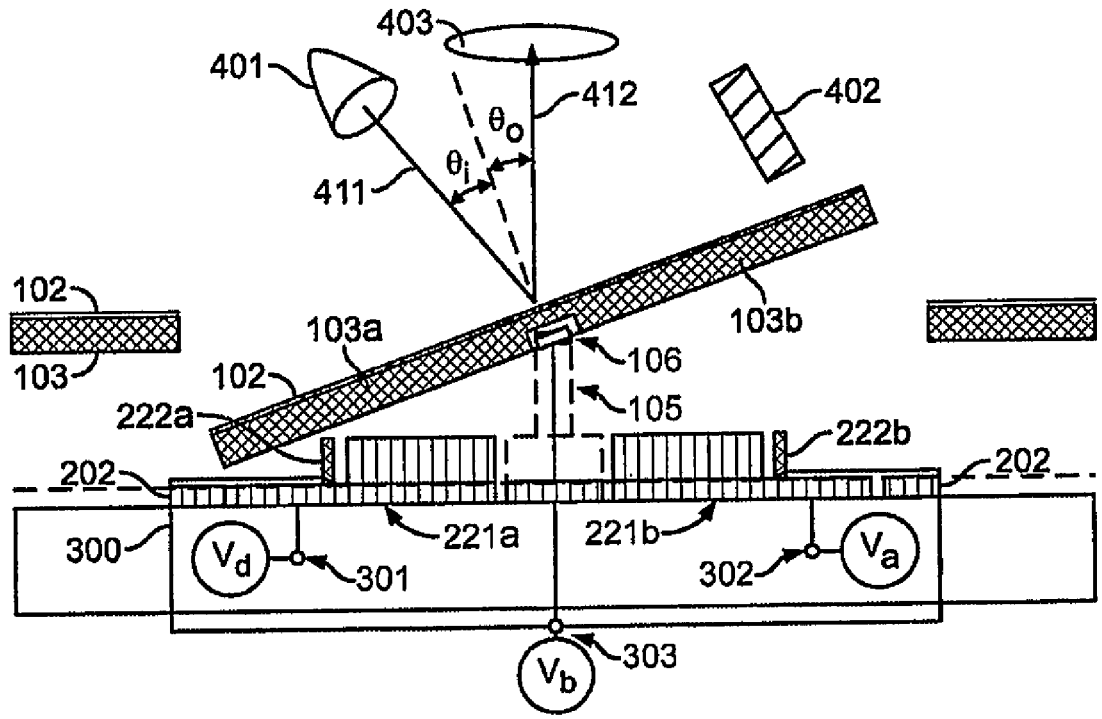

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,167,298 B2 Page 1 of 1
APPLICATION NO. : 10/974468
DATED : January 23, 2007
INVENTOR(S) : Shaoher X. Pan It is certified that error appears in the above-identified patent and that said Letters Patent is hereby corrected as shown below:

Column 16, Line 20 at Claim 1; replace:
"binge" with
--hinge--

Column 18, Line 28 at Claim 21; replace:
"binge" with
--hinge--

Signed and Sealed this

Sixth Day of November, 2007

JON W. DUDAS
*Director of the United States Patent and Trademark Office*